United States Patent
Sauve et al.

(10) Patent No.: US 6,318,786 B1
(45) Date of Patent: Nov. 20, 2001

(54) ADJUSTABLE DEAD PEDAL FOR A MOTOR VEHICLE

(75) Inventors: Paul J Sauve, Warren; Paul S Larsen, Ortonville; James Finck, Canton, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/698,851

(22) Filed: Oct. 27, 2000

(51) Int. Cl.[7] .................................................... B60N 3/06
(52) U.S. Cl. ........................................................... 296/75
(58) Field of Search .............................. 296/75, 40, 104; 248/225.11, 224.7, 225.21

(56) References Cited

U.S. PATENT DOCUMENTS

| | | | |
|---|---|---|---|
| 2,679,432 | * | 5/1954 | Ruth .................................... 296/40 |
| 2,747,924 | * | 5/1956 | Walther ................................. 296/75 |
| 3,784,247 | * | 1/1974 | Mills .................................... 296/75 |
| 4,310,193 | * | 1/1982 | Kolleas ................................ 296/75 |
| 5,152,487 | * | 10/1992 | Defatte et al. ................... 248/225.11 |
| 6,073,515 | * | 6/2000 | Elton et al. ....................... 296/75 X |

* cited by examiner

Primary Examiner—Stephen T. Gordon
Assistant Examiner—Lori L Coletta
(74) Attorney, Agent, or Firm—Mark P Calcaterra

(57) ABSTRACT

An adjustable dead pedal apparatus for a motor vehicle is provided. The adjustable dead pedal apparatus includes a bracket that is removeably attached to a vehicle side wall. A pedal structure is selectively secured to one of a plurality of position on the bracket. The pedal structure can be moved in the fore/aft direction by removing the bracket from the side wall and removing the pedal structure from the bracket from a first position and reattaching the pedal structure at a second position. The bracket can then be reattached to the vehicle side wall.

1 Claim, 1 Drawing Sheet

ADJUSTABLE DEAD PEDAL FOR A MOTOR VEHICLE

BACKGROUND OF THE INVENTION

1. Technical Field

The present invention relates in general to motor vehicle pedals. More particularly, the present invention relates to an adjustable dead pedal for use in a motor vehicle.

2. Discussion

All conventional automobiles include a variety of pedals. Most vehicles have an accelerator pedal that controls the engine throttle and a brake pedal that controls actuation of the braking system. Some vehicles that are equipped with a manual transmission have a clutch pedal. The operator typically uses his or her right foot to actuate both the accelerator and the brake and in vehicles with a clutch, the operator uses his or her left foot to actuate the clutch.

In vehicles with automatic transmissions and no clutch pedal, the operator's left foot performs no appreciable purpose with respect to the function of the vehicle. In vehicles with manual transmissions and clutch pedals, the operator's left foot is used only during the changing of gears of the transmission. Some vehicles provide what is commonly referred to as a 'dead pedal' which provides a somewhat upright and angled location for the operator to place his or her left foot. A dead pedal provides advantages to the occupant over simply placing his or her left foot on the floor. By having an upright and angled location, the operator can apply pressure with his or her left foot to stabilize their position in the vehicle seat. This function is even more critical when dealing with performance cars where drivers require the ability to stabilize themselves in the vehicle seat. Because of this purpose and the relatively easy construction, the dead pedal has become a staple in the automotive industry, especially in performance vehicles.

Although stationary dead pedals perform the aforementioned function satisfactorily, many people prefer a dead pedal that is at a certain depth in the car. Some operators like the dead pedal close enough to them such that their left leg is bent, while others like the dead pedal far enough away to outstretch their leg. There is, therefore, a need to provide an adjustable dead pedal for an automobile. There is also a need to provide an inexpensive apparatus for an adjustable dead pedal. There is a further need to provide a simple and easy method to adjust the dead pedal in the fore and aft directions.

SUMMARY OF THE MENTION

Accordingly, it is the principal objective of the present invention to provide an adjustable dead pedal apparatus for a motor vehicle It is another objective of the present invention to provide an adjustable dead pedal apparatus for a motor vehicle with a pedal structure that can be easily translated to a plurality of positions in the fore and aft direction.

It is yet another objective of the present invention to provide a simple and easy method for adjusting a dead pedal of a motor vehicle.

In one form, the present invention concerns an adjustable dead pedal for a motor vehicle. The adjustable dead pedal apparatus includes a bracket that is removeably attached to a vehicle side wall. A pedal structure is selectively secured to one of a plurality of positions on the bracket. The pedal structure can be moved in the fore/aft direction by removing the bracket from the side wall and removing the pedal structure front the bracket from a first position and reattaching the pedal structure at a second position. The bracket can then be reattached to the vehicle side wall.

Additional benefits and advantages of the present invention will become apparent to those skilled in the art to which this invention relates from a reading of the subsequent description of the preferred embodiment and the appended claims, taken in conjunction with the accompanying drawings.

BRIEF DESCRIPTION OF THE DRAWINGS

The drawings, which form an integral part of the specification, are to be written in conjunction therewith, and like reference numerals are employed to designate identical components in various views.

DETAILED DESCRIPTION OF THE PREFERRED EMBODIMENT

An adjustable dead pedal apparatus for motor vehicles is provided. In the following description, numerous specific details are set forth in order to provide a more comprehensive description of the present invention. It will be apparent, however, to one skilled in the art, that the present invention may be practiced without these specific details. In other instances, specific details of well-known features have not been described so as not to obscure the present invention.

Figure 1:
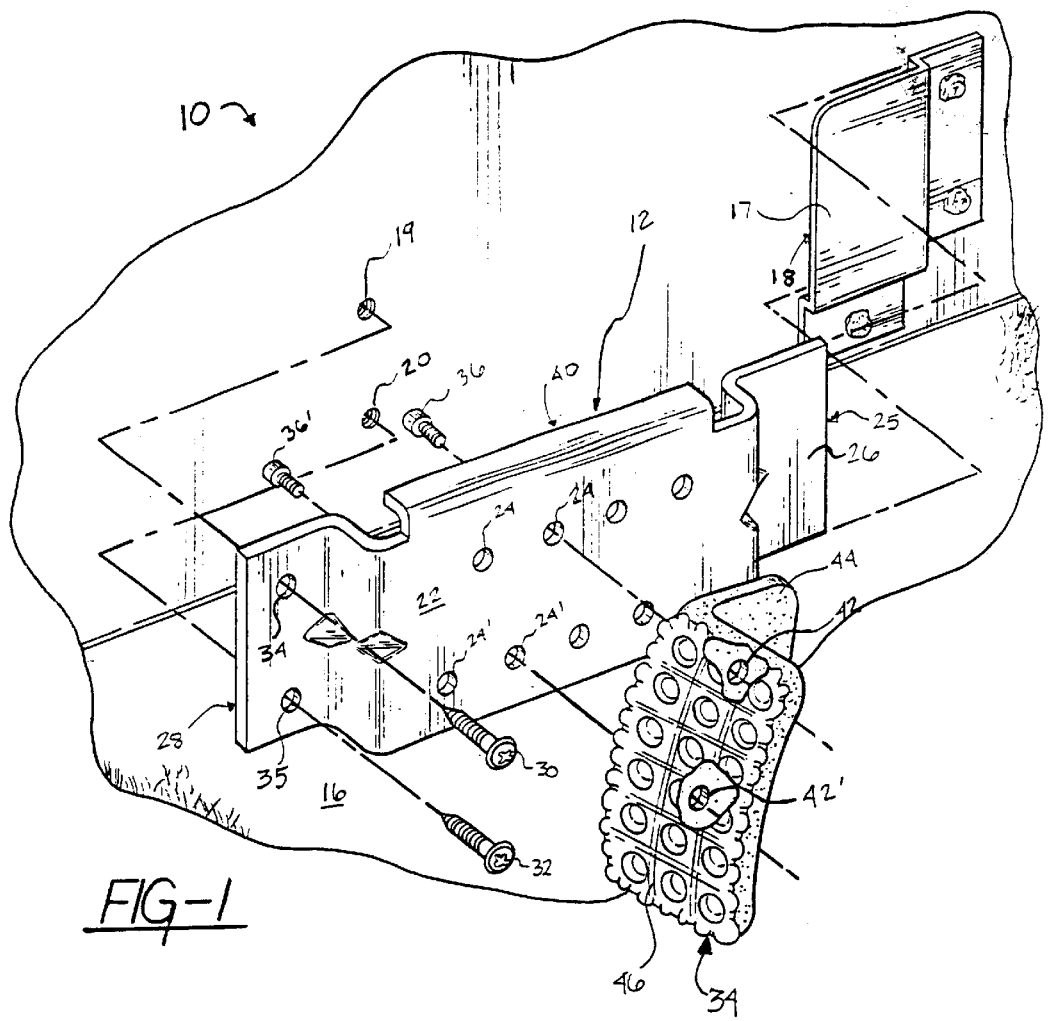
FIG. 1 is an exploded view of the adjustable dead pedal apparatus of the present invention.
Figure 2:
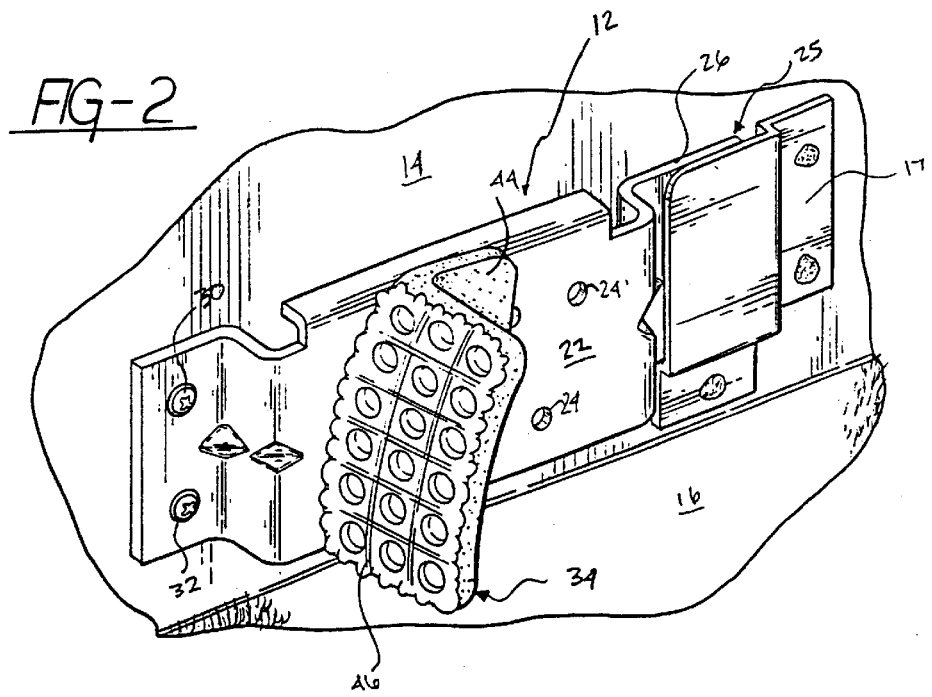
FIG. 2 is an assembled perspective view of the adjustable dead pedal apparatus of the present invention.

Referring now to the drawings, FIG. 1 illustrates an exploded view of the adjustable pedal apparatus 10 of the present invention and FIG. 2 illustrates an assembled view thereof. The adjustable dead pedal apparatus 10 includes an attachment bracket 12 that is adapted to be attached to the left side wall 14 of the vehicle interior. Although not specifically shown, the left side wall 14 is disposed forward of the front left door and near the vehicle floor 16. The left side wall 14 includes a mounting brace 17 attached thereto that creates a slot 18. Side wall 14 also includes a top and bottom threaded bore 19, 20 formed therein. It should be noted that the left side wall 14 can be formed with an aperture that creates a slot as opposed to a bracket as in the preferred embodiment of the present invention.

The attachment bracket 12 includes a main body portion 22 that forms the top pat of a bat section and includes a plurality of holes 24 formed therein. The plurality of holes 24 are set with mating pairs 24' that are disposed in a fixed relationship therewith. The plurality of holes extend forward and rearward to define a plurality of possible positions for attachment of a pedal structure 34 thereto. The attachment bracket 12 also includes a tab 26 extending from the forward edge 25 thereof. The tab 26 is curved for easy insertion into slot 18 formed by mounting brace 17 and side wall 14. Once tab 26 is inserted into slot 18, the bracket 12 is positioned such that rear end 28 contacts side wall 14. The rear end 28 is then secured to the side wall 14 via screws 30, 32 that are inserted through openings 34, 31, respectively and received by threaded bores 19, 20 respectively.

Pedal structure 34 is secured to bracket 12 via fastening elements 36 and 36'. Each fastening element 36, preferably screws, is inserted from the back side 40 of the bracket 12 through one of said plurality of holes 24 and into a threaded receptacle 42 formed in said pedal structure 34. In the preferred embodiment, a second fastening element 36' is inserted through the hole's mating pair 24' and secured into a second threaded receptacle 42'. Pedal structure 34 includes a mounting portion 44 that is formed to contact bracket 12 and includes a plurality of threaded receptacles 42, 42'. Pedal structure 34 also includes a pedal detail 46 that extends in a perpendicular fashion from the forward edge of the mounting portion 44. Pedal detail 46 is adapted to provide a surface upon which the operator of the vehicle can place his or her left foot.

To adjust the fore/aft location of the pedal detail 46, screws 30, 32 are removed from the coupling arrangement with the threaded bores 19, 20 of the side wall 14. Once screws 30, 32 are removed, bracket 12 is transitioned such that tab 26 is removed from slot 18. Once removed, the pedal structure 34 can be removed from the bracket 12 by removing fastening elements 36, 36' from the treaded receptacles 42,42' formed in the pedal structure 34. By doing so, the pedal structure 34 and the bracket 12 are separated, and the pedal structure 34 can be moved freely to a position where the treaded receptacles 42, 42' mate with a different pair of holes 24, 24' formed in the bracket 12. Bracket 12 includes a plurality of holes 24 that vary in the fore and aft direction and define a plurality of possible positions for the pedal structure 34. The threaded receptacles 42, 42' of the pedal structure 34 can be cooperative with a plurality of pairs of holes 24, 24' in the bracket 12, thereby providing a plurality of fore/aft positions of the pedal structure 34. Once the pedal structure 34 is secured to the bracket 12 via fastening elements 36,36', the bracket 12 is then secured to the side wall 14 as described previously.

It should be appreciated that many variations to this invention as described herein can be employed that are within the breadth and scope of the present invention. For example, the holes 24 in the bracket 12 could be situated in the vertical direction as well as the fore/aft direction to allow for vertical adjustability of the pedal structure 34. Furthermore, a block having a hole formed therethrough can be placed between the bracket 12 and the pedal structure 34 to provide adjustment in the lateral direction. A longer fastening element 36 would, of course, be needed to interconnect the bracket 12, block, and pedal structure 34.

The foregoing description constitutes the preferred embodiments devised by the inventors for practicing the invention. It is apparent; however, that the invention is susceptible to modification, variation and change that will be obvious to those skilled in the art. Inasmuch as the foregoing description is intended to enable one skilled in the pertinent art to practice the invention, it should not be construed to be limited thereby but should be construed to include such aforementioned obvious variations and be limited only by the proper scope or fair meaning of the accompanying claims.

What is claimed is:

1. An adjustable pedal assembly in combination with a side wall of a motor vehicle;

said pedal assembly comprising a mounting bracket having an elongated pedal-mounting portion;

said bracket having a first tab at a first end of the pedal-mounting portion;

means securing said first tab to said side wall;

said bracket having a second tab at a second end of said pedal-mounting portion;

a brace having walls cooperating with said side wall to define a pocket in which the second tab is received;

said pocket having an end entry facing toward said bracket and a top entry, both said entries dimensioned to admit said second tab to facilitate insertion of said second tab into said pocket;

means securing said brace to said side wall;

a plurality of pairs of laterally spaced holes in the pedal-mounting portion of said bracket, each of said pairs of holes being spaced apart lengthwise of said pedal-mounting portion;

a dead pedal, and means securing said dead pedal in adjusted position to the pedal-mounting portion of said bracket including threaded fasteners extending respectively through the holes of a selected pair of holes, said fasteners threadedly engaging threaded receptacles in said dead pedal.

* * * * *